(12) United States Patent
Sato

(10) Patent No.: US 7,239,716 B2
(45) Date of Patent: Jul. 3, 2007

(54) DATA INSERTION DEVICE AND METHOD OF INSERTING DATA

(75) Inventor: Shinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 917 days.

(21) Appl. No.: 10/010,700

(22) Filed: Nov. 8, 2001

(65) Prior Publication Data

US 2002/0106106 A1    Aug. 8, 2002

(30) Foreign Application Priority Data

Nov. 8, 2000    (JP)    ............................. 2000-339803

(51) Int. Cl.
*G06K 9/00*    (2006.01)
*G06K 9/36*    (2006.01)

(52) U.S. Cl. ...................... 382/100; 382/232

(58) Field of Classification Search ............... 382/100, 382/232, 236, 253, 233, 235, 238; 375/240.16; 725/32; 341/51; 386/27; 380/217; 348/465
See application file for complete search history.

(56) References Cited

U.S. PATENT DOCUMENTS

| | | | | |
|---|---|---|---|---|
| 5,835,671 A | * | 11/1998 | Kitamura et al. ............. | 386/97 |
| 5,838,265 A | * | 11/1998 | Adolph ........................ | 341/50 |
| 5,940,134 A | * | 8/1999 | Wirtz .......................... | 348/473 |
| 5,945,932 A | * | 8/1999 | Smith et al. .................. | 341/51 |
| 6,005,632 A | * | 12/1999 | Cahill, III ................... | 348/465 |
| 6,125,144 A | * | 9/2000 | Matsumura et al. ... | 375/240.12 |
| 6,208,745 B1 | * | 3/2001 | Florencio et al. ........... | 382/100 |
| 6,229,924 B1 | * | 5/2001 | Rhoads et al. .............. | 382/232 |
| 6,310,962 B1 | * | 10/2001 | Chung et al. ............... | 382/100 |
| 6,357,042 B2 | * | 3/2002 | Srinivasan et al. .......... | 725/32 |
| 6,400,768 B1 | * | 6/2002 | Nagumo et al. ....... | 375/240.18 |
| 6,621,933 B2 | * | 9/2003 | Chung et al. ............... | 382/233 |
| 6,748,020 B1 | * | 6/2004 | Eifrig et al. ........... | 375/240.26 |
| 6,798,893 B1 | * | 9/2004 | Tanaka ....................... | 382/100 |
| 2001/0021260 A1 | * | 9/2001 | Chung et al. ............... | 382/100 |
| 2001/0023436 A1 | * | 9/2001 | Srinivasan et al. ......... | 709/219 |
| 2001/0053535 A1 | * | 12/2001 | Bashir et al. ................. | 435/34 |

FOREIGN PATENT DOCUMENTS

| | | |
|---|---|---|
| JP | 7-15729 | 1/1995 |
| JP | 11-164235 | 6/1999 |
| JP | 2000-32406 | 1/2000 |

OTHER PUBLICATIONS

Hartung et al, Digital Watermarking of MPEG-2 Coded Video in the Bitstream Domain, 1997, vol. 4, pp. 2621-2624.*

* cited by examiner

*Primary Examiner*—Duy M. Dang
(74) *Attorney, Agent, or Firm*—Scully, Scott, Murphy & Presser, P.C.

(57) ABSTRACT

An data insertion device inserts pattern data including information related to digital watermarking into digital image data such as MPEG2 data. First, the MPEG2 data are read picture by picture, and a type of each picture is determined. Then, an insertion intensity of the pattern data is adjusted based on the type of the picture. Finally, the pattern data, which are used for digital watermarking, are inserted into the picture with the adjusted insertion intensity.

9 Claims, 4 Drawing Sheets

DATA INSERTION DEVICE AND METHOD OF INSERTING DATA

BACKGROUND OF THE INVENTION

1. Field of the Invention

The invention relates to a device and method for inserting data and, in particular, to a data insertion method which inserts predetermined pattern data, such as digital watermarking data, to digital image data compressed by MPEG2 (Moving Picture Experts Group 2).

2. Description of the Related Art

Conventionally, a kind of data insertion devices (circuits) are used to insert data to digital image data.

Some of the conventional devices provide digital watermarking by inserting pattern data into MPEG2 data including a sequence of pictures each of which belongs to one of I picture (Intra picture), P picture (Predictive picture), and B picture (Bidirectionally predictive-coded picture).

However, the conventional devices have a problem that a quality of image deteriorates.

The reason is that, a data amount of the pattern data inserted into a P picture is larger than an data amount of the pattern data inserted to an I picture, considering a decoding procedure of each picture, and therefore, in the P picture, there becomes a large difference between the P picture in which the pattern data are inserted and the original image data to be included in the P picture.

Moreover, when the data amount of the pattern data inserted into each picture varies, it seems that a moving picture resulted from a series of pictures waves.

SUMMARY OF THE INVENTION

Therefore, it is an object of the invention to provide a device and a method for inserting digital watermarking data to image data without a degradation of an image quality of the image data.

According to a first aspect of the invention, there is provided a data insertion device which inserts predetermined pattern data into compressed image data.

According to a second aspect of the invention, there is provided a data insertion device which includes an input device which inputs image data including a plurality of types of pictures, a determining device which determines the type of the picture for each picture, and an inserting device which inserts pattern data into each picture with an insertion intensity according to the type determined about the corresponding picture.

According to a third aspect of the invention, there is provided the data insertion device of the second aspect, wherein the inserting device modifies the pattern data to have the insertion intensity and inserts the modified pattern data into the picture.

According to a fourth aspect of the invention, there is provided the data insertion device of the third aspect, wherein the modification is done by multiplying the pattern data by a multiplier rate which is adjusted according to the determined type.

According to a fifth aspect of the invention, there is provided the data insertion device of the second aspect, wherein a group of pattern data are prepared each of which are generated so as to have the insertion intensity according to one of the types of the pictures, and the inserting device selects one of the group of pattern data and inserts them into the corresponding picture.

According to a sixth aspect of the invention, there is provided the data insertion device of the second aspect, wherein the pattern data includes information related to digital watermarking.

According to a seventh aspect of the invention, there is provided the data insertion device of the second aspect, wherein the image data are MPEG2 data, and the types of pictures includes I picture, P picture, and B picture.

According to an eighth aspect of the invention, there Is provided a method of inserting data. The method comprises the steps of inputting image data including a plurality of types of pictures, determining the type of the picture for each picture, and inserting pattern data into each picture with an insertion intensity according to the type determined about the corresponding picture.

According to a ninth aspect of the invention, there is provided a recording medium readable by a computer, tangibly embodying a program of instructions executable by the computer to perform a method of inserting data. The method comprises the steps of inputting image data including a plurality of types of pictures, determining the type of the picture for each picture, and inserting pattern data into each picture with an insertion intensity according to the type determined about the corresponding picture.

According to a tenth aspect of the invention, there is provided a computer data signal embodied in a carrier wave and representing a sequence of instructions which, when executed by a processor, cause the processor to perform a method of inserting data. The method comprises the steps of inputting image data including a plurality of types of pictures, determining the type of the picture for each picture, and inserting pattern data into each picture with an insertion intensity according to the type determined about the corresponding picture.

According to an eleventh aspect of the invention, there is provided a program product comprising, computer readable instructions and a recording medium bearing the computer readable instructions, the instructions being adaptable to enable a computer to perform a method of inserting data. The method comprising the steps of inputting image data including a plurality of types of pictures, determining the type of the picture for each picture, and inserting pattern data into each picture with an insertion intensity according to the type determined about the corresponding picture.

DESCRIPTION OF THE PREFERRED EMBODIMENT

Figure 1:
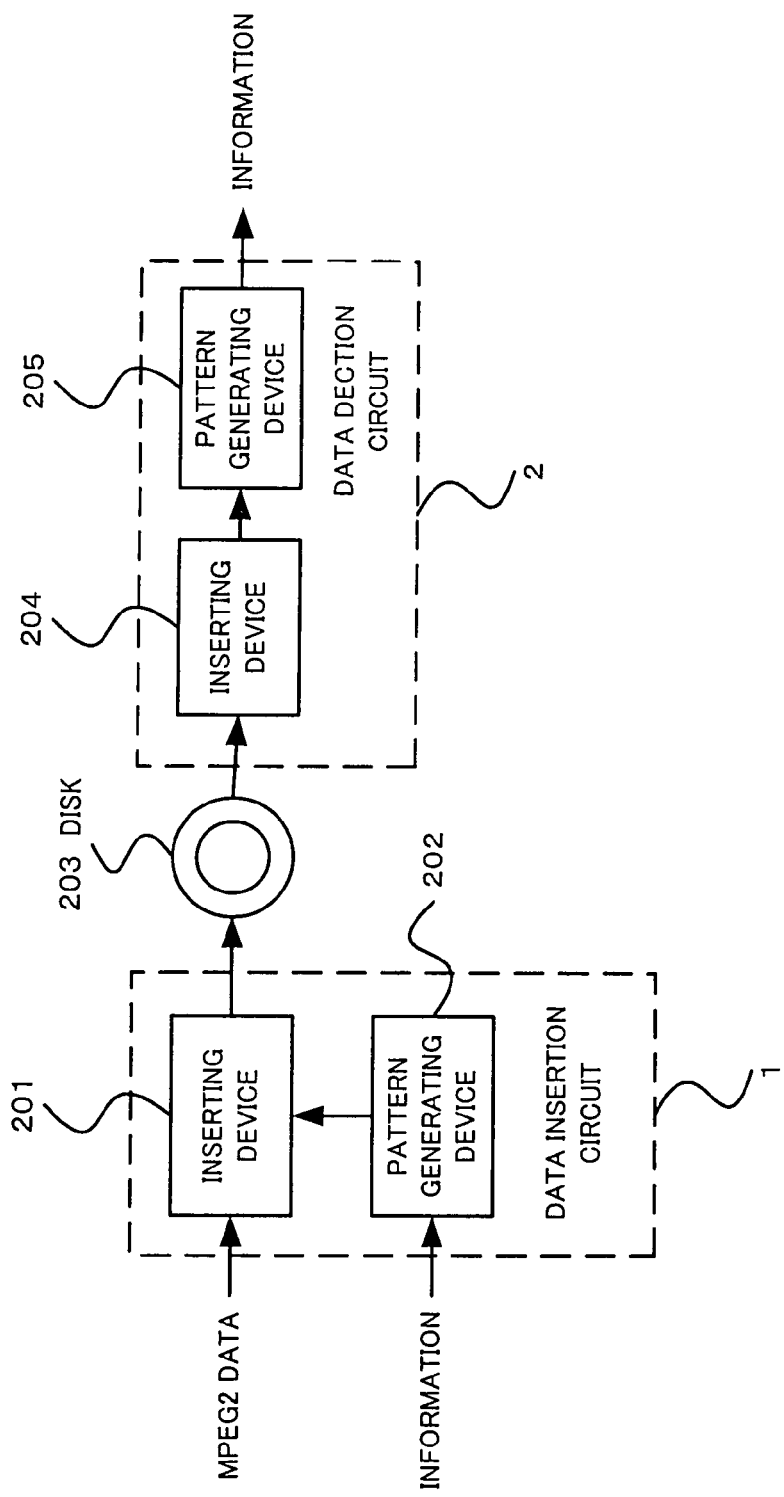
FIG. 1 shows a block diagram of a conventional data insertion/detection system.

At first, description is made about an example of the conventional data insertion/detection system with reference to FIG. 1.

The system includes a data insertion circuit 1 and a data detection circuit 2. The data insertion circuit 1 is a circuit which generates pattern data and inserts the data into digital image data.

The data insertion circuit 1 includes an inserting device 201 and a pattern generator 202. When the pattern generator 202 generates the pattern data based on information related to a digital watermarking, according to a certain rule. Then, the pattern data are inserted into the digital image data by the inserting device 201.

The digital image data thus including the pattern data are then recorded on a storage medium, such as a disk 203. The data detection circuit 2 extracts the pattern data from the digital image data recorded on the storage medium.

The extracted pattern data are then used to decode the information related to the digital watermarking, according to a predetermined rule.

Figure 2:
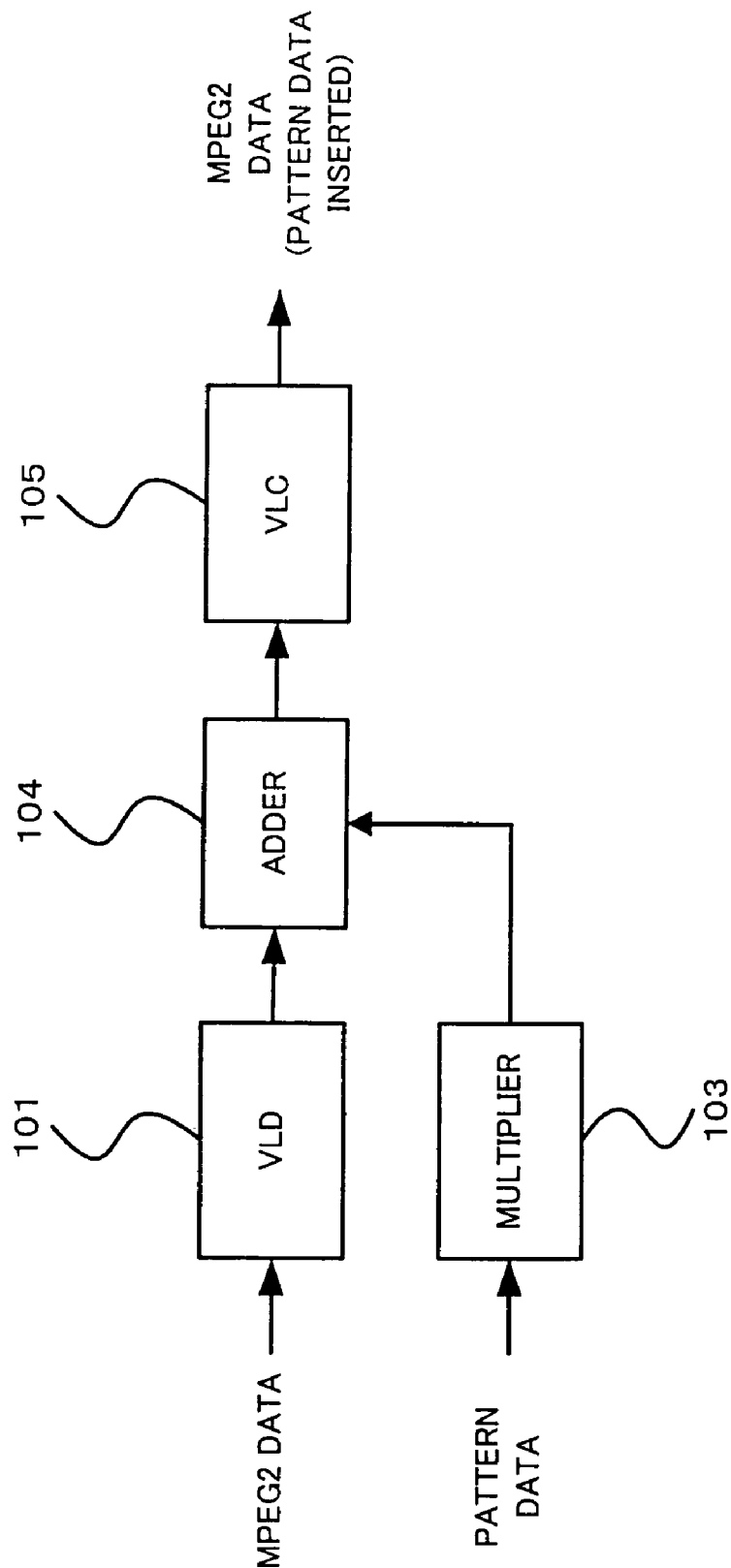
FIG. 2 shows a composition of a conventional data insertion circuit.

Next, description is made about another insertion circuit for providing a digital watermarking to digital image data coded by MPEG2 (MPEG2 data), with reference to FIG. 2. FIG. 2 shows a composition of the insertion circuit. The insertion circuit includes a VLD (Variable Length Decoder) 101, a multiplier 103, an adder 104, and a VLC (Variable Length Coder) 105.

The MPEG2 data are obtained by encoding (and compressing) digital image data using a digital image coding method MPEG2.

Since the MPEG2 data are coded in a variable length, before insertion of the digital watermarking, the MPEG2 data are decoded by the VLD 101.

Pattern data which are to be inserted in the MPEG2 data and are related to a digital watermarking, can be obtained in the same way as described in FIG. 1. Also, an insertion intensity of the pattern data is adjusted by computing a certain multiplying rate using the multiplier 103. And then, the pattern data are inserted into the decoded MPEG2 data by the adder 104. The decoded MPEG2 data which are supplied for the adder 104 are again coded in a variable length by the VLC 105 (Variable Length Coder) and supplied as MPEG2 data.

The MPEG2 data includes, as described above, three types of pictures, that is, I picture, P picture, and B picture.

When the MPEG2 data are decoded to generate a moving picture, I picture, P picture, and B picture are decoded by using each decode procedure.

That is, I picture is decoded by using the I picture its own to generate a picture in a moving picture. P picture is decoded by using I picture and/or P picture(s) before the current P picture, and the current P picture its own.

Further, B picture is decoded by using I picture and/or P picture(s) before the B picture or after the B picture.

A moving picture is provided by processing the above decoding process in order.

Here, a general composition of the MPEG2 data of NTSC (National Television System Committee) is shown below as example, and the general composition is explained with reference to the example.

In addition, Ix denotes an I picture, Px denotes a P picture, and Bx denotes a B picture.

(I1, B1, B2, P1, B3, B4, P2, B5, B6, P3, B7, B8, P4, B9, B10)

When the shown sequence of the pictures are inputted into the insertion device shown in FIG. 2, pattern data are inserted into each data (I1, B1, . . . ).

When the MPEG2 data are decoded as described above, an I picture is decoded by using only an I picture I1. However, a P picture related to P1 is decoded from an I picture I1 and a P picture P1, and another P picture related to P2 is decoded by using P pictures P1 and P2.

Moreover, B picture related to B1 is decoded from an I picture I1, a P picture P1, and a B picture B1, and a B picture related to B2 is decoded from an I picture I1, a P picture P1, and a B picture B2.

Here, although the pattern data are inserted into each picture (I1, B1, . . . ), when the P picture related to P1 are, for example, decoded, the pattern data included in the I picture I1 and the P picture P1 are accumulated and extracted, since in decoding the P picture, the I picture I1 and the P picture P1 are used.

Similarly, since the P pictures P1 and P2 are used when the P picture related to P2 is decoded, and the I picture I1 and the P picture P1 are used to decode the P picture corresponding to picture data P1, pattern data which are inserted into the I picture I1, and the P pictures P1 and P2 are accumulated and extracted in decoding the P picture related to picture data P2.

When the B picture related to Bx is decoded, an I picture Ix and a P picture Px which are located before or after the B picture Bx are used. However, the B picture Bx originally have a relatively small size in length. Therefore, a small amount of pattern data should be inserted into the B picture.

Also, since the I picture Ix and the P picture Px are used in the decoding, it is possible to apply a small insertion intensity of the pattern data about the B picture. However, for the B picture, the same insertion intensity is conventionally used as that of the I picture and the P picture.

Figure 3:
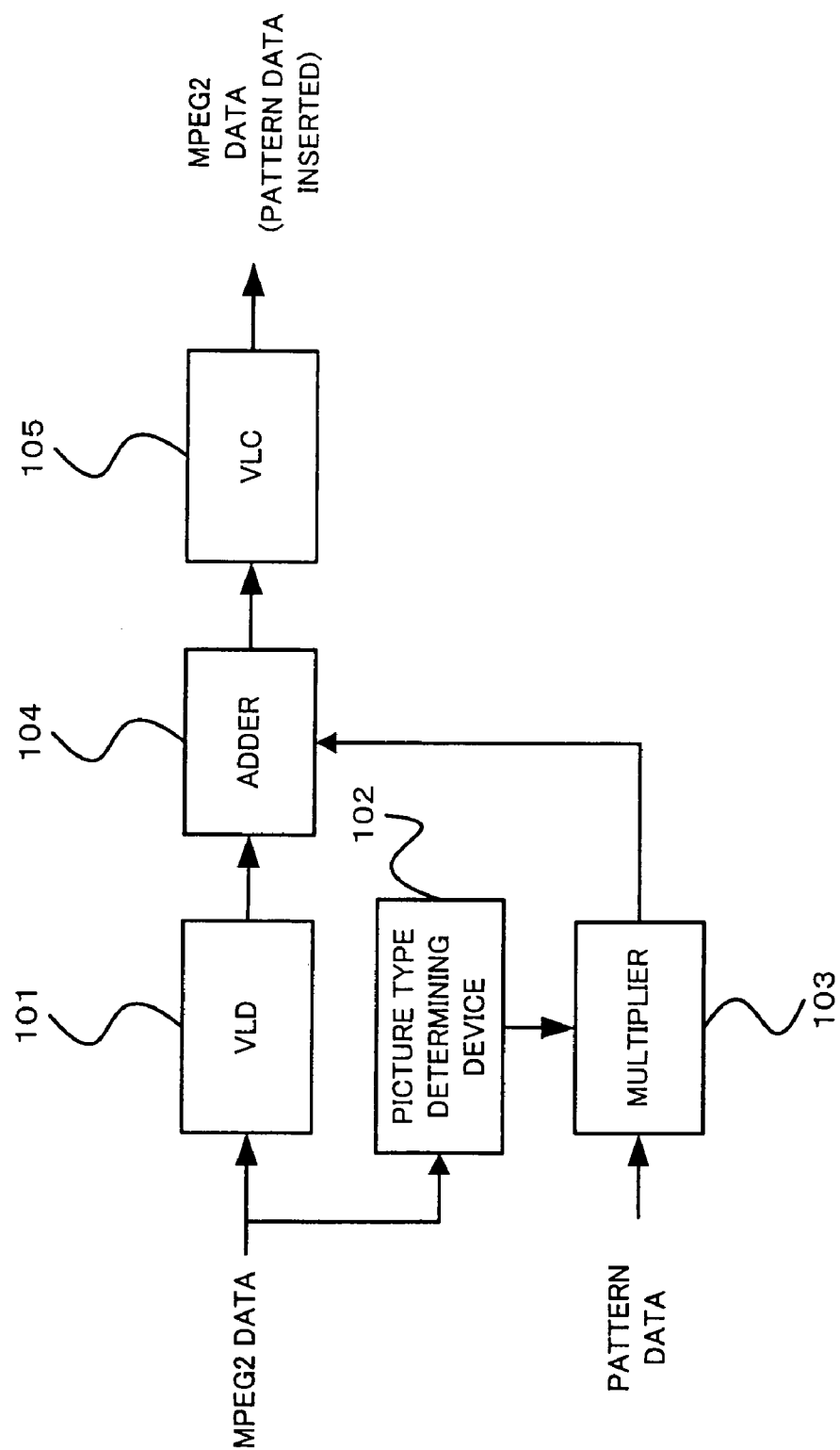
FIG. 3 shows a block diagram of a first embodiment of the invention.

Next, description is made about a first embodiment of the invention, with reference to FIG. 3. An insertion device is shown in FIG. 3 according to the first embodiment of the invention. The insertion device includes a VLD 101, a picture type determining device 102, a multiplier 103, an adder 104, and a VLC 105.

The picture type determining device 102 determines whether a received picture of MPEG2 data belongs to an I picture, a P picture, or a B picture. The VLD 101 decodes the received MPEG2 data (picture) in a variable length.

The multiplier 103 receives a determining result from the picture type determining device 102 and pattern data, and multiplies a value of the pattern data by a certain multiplier based on the result. The adder 104 inserts the multiplied pattern data to the decoded MPEG2 data sent from the VLD 100. The VLC 105 codes the decoded MPEG2 data with the inserted pattern data, in variable length to generate MPEG2 data.

Next, operations of the insertion device shown in FIG. 3 are explained below.

First, the MPEG2 data are sent to the VLD 101 and the picture type determining device 102 picture by picture. When the picture type determining device 102 receives the picture of the MPEG2 data, the device determines whether the picture is an I picture, a P picture, or a B picture. The determination is easily carried out by extracting "Picture Coding Type" from a picture header in the picture. The determining result is then sent to the multiplier 103.

At the VLD 101, the MPEG2 data are decoded.

The multiplier 103 multiplies the pattern data by a certain multiplier based on the determining result. For example, if the received picture is an I picture, the multiplier is set to 1.0, if the picture is a P picture, the multiplier is set to 0.3, and if the picture is B picture, the multiplier is set to 0.1. The multiplying result is then sent to the adder 104 and wherein, the multiplied pattern data are inserted into decoded data from the VLD 101.

The data in which the pattern data are inserted are then coded in a variable length by the VLC 105 and provided as MPEG2 data including the pattern data of digital watermarking.

As described above, the insertion intensity of pattern data can be adjusted by changing a value of the multiplier according to a type of the received picture. In the above example, the insertion intensity of pattern data about a P picture and a B picture is controlled to be smaller than that about an I picture. Thereby, when the MPEG2 data are decoded to generate a moving picture, degradation of image quality can be prevented since each picture is decoded from the MPEG2 data to have a similar amount of pattern data. That is, regardless of the number or type of pictures (for example, I picture, P picture, B picture) which are used to decode a picture of a moving picture, an approximately fixed amount of pattern data are included.

Figure 4:
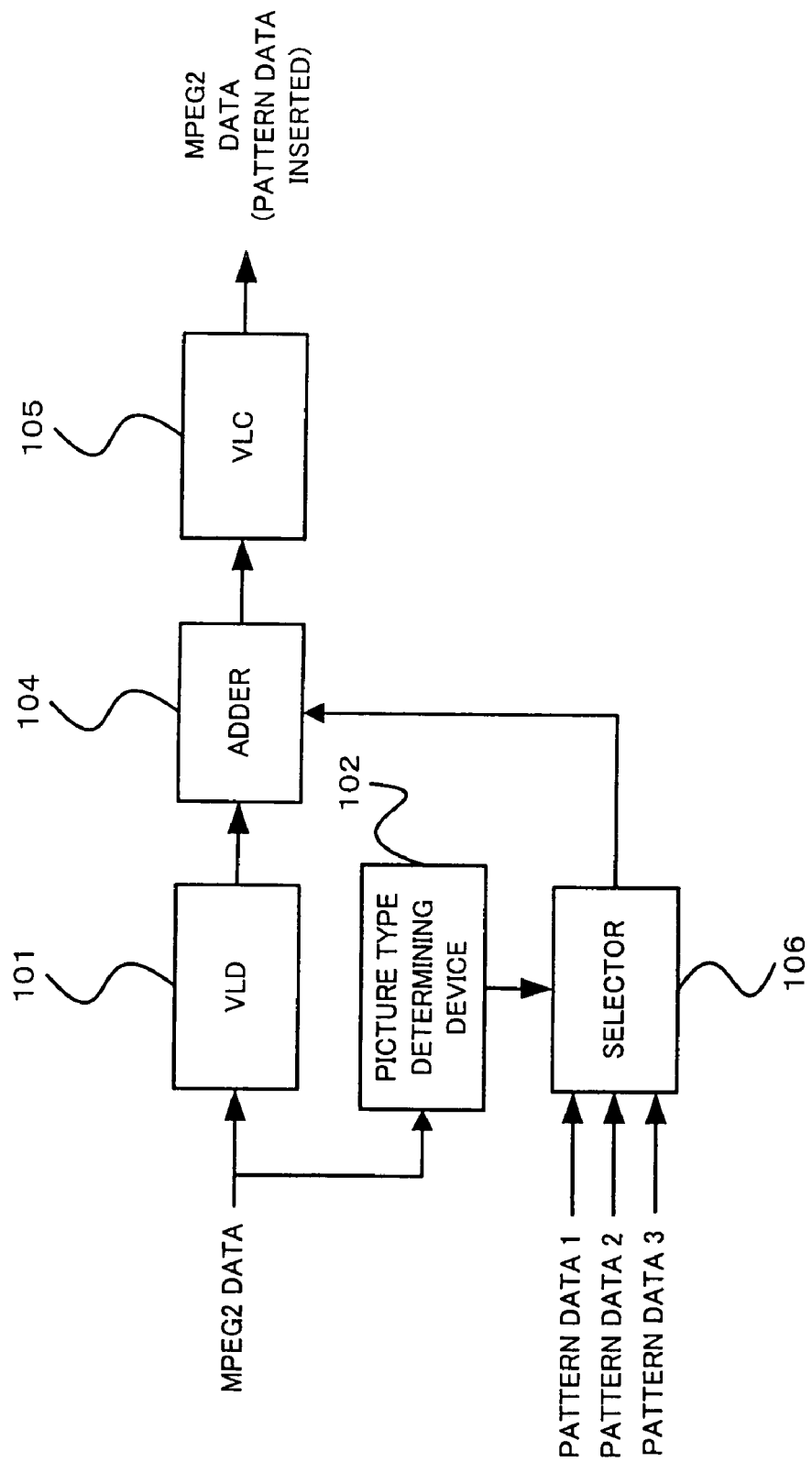
FIG. 4 shows a block diagram of a second embodiment of the invention.

Then, description is made about a second embodiment of the invention with reference to FIG. 4. In FIG. 4, an insertion device according to the second embodiment of the invention is shown, which is different from the insertion device shown in FIG. 3 in that the multiplier 103 is replaced by a selector 106.

The selector 106 receives, in advance, three pattern data, that is, pattern data 1, pattern data 2, and pattern data 3. Each of the pattern data includes an insertion intensity sent to the adder 104 and corresponds to one of types of pictures, an I picture, a P picture, and a B picture. The selector 106 selects one of the pattern data according to a determining result from the picture determining device 102, and sends the selected pattern data to the adder 104.

The adder 104 receives the decoded MPEG2 data from the VLD 101 and the pattern data from the selector 106, and wherein, the pattern data are inserted into the decoded MPEG2 data. The decoded MPEG2 data in which the pattern data are inserted are then sent to VLC 105. The VLC 105 codes the decoded MPEG2 data in a variable length.

Therefore, when the MPEG2 data supplied from the VLC 105 are decoded to generate a moving picture, degradation of an image quality can be prevented since an amount of the pattern data is adjusted according to an amount of the picture in the MPEG2 data.

As described above, an effect of the invention is to be able to prevent from degradation of an image quality. The technique of the invention can be applied to other various image coding method other than MPEG2.

According to the invention, pattern data are inserted to each picture of MPEG2 data with an insertion intensity which is adjusted based on a type of picture. Therefore, when the MPEG2 data are expanded, each picture has a similar quantity of pattern data. As a result, a noise of the picture, which causes a waved picture, is effectively prevented.

What is claimed is:

1. A data insertion device comprising:
   an input device which inputs compressed image data including a plurality of types of pictures;
   a determining device which determines the type of the picture for each picture; and
   an inserting device which inserts pattern data into each picture with an insertion intensity according to the type determined about the corresponding picture, the pattern data being modified by the inserting device to have the insertion intensity, the modified pattern data subsequently being inserted into the picture, the pattern data being multiplied by a multiplier rate which is adjusted according to the determined type.

2. The data insertion device of claim 1, wherein a group of pattern data are prepared each of which are generated so as to have the insertion intensity according to one of the types of the pictures, and the inserting device selects one of the group of pattern data and inserts them into the corresponding picture.

3. The data insertion device of claim 1, wherein the pattern data includes information related to digital watermarking.

4. The data insertion device of claim 1, wherein the image data are MPEG2 data, and the types of pictures includes I picture, P picture, and B picture.

5. A method of inserting data, comprising the steps of:
   inputting compressed image data including a plurality of types of pictures;
   determining the type of the picture for each picture; and
   inserting pattern data into each picture with an insertion intensity according to the type determined about the corresponding picture, the pattern data being modified during the inserting step to have the insertion intensity, the modified pattern data subsequently being inserted into the picture, the pattern data being multiplied by a multiplier rate which is adjusted according to the determined type.

6. The method of claim 5, wherein a group of pattern data are prepared each of which are generated so as to have the insertion intensity according to one of the types of the pictures, and the inserting step selects one of the group of pattern data and inserts them into the corresponding picture.

7. The method of claim 5, wherein the pattern data includes information related to digital watermarking.

8. The method of claim 5, wherein the image data are MPEG2 data, and the types of pictures includes I picture, P picture, and B picture.

9. A recording medium readable by a computer, tangibly embodying a program of instructions executable by the computer to perform a method of inserting data, the method comprising the steps of:
   inputting compressed image data including a plurality of types of pictures;
   determining the type of the picture for each picture; and
   inserting pattern data into each picture with an insertion intensity according to the type determined about the corresponding picture, the pattern data being modified during the inserting step to have the insertion intensity, the modified pattern data subsequently being inserted into the picture, the pattern data being multiplied by a multiplier rate which is adjusted according to the determined type.

* * * * *